UNITED STATES PATENT OFFICE.

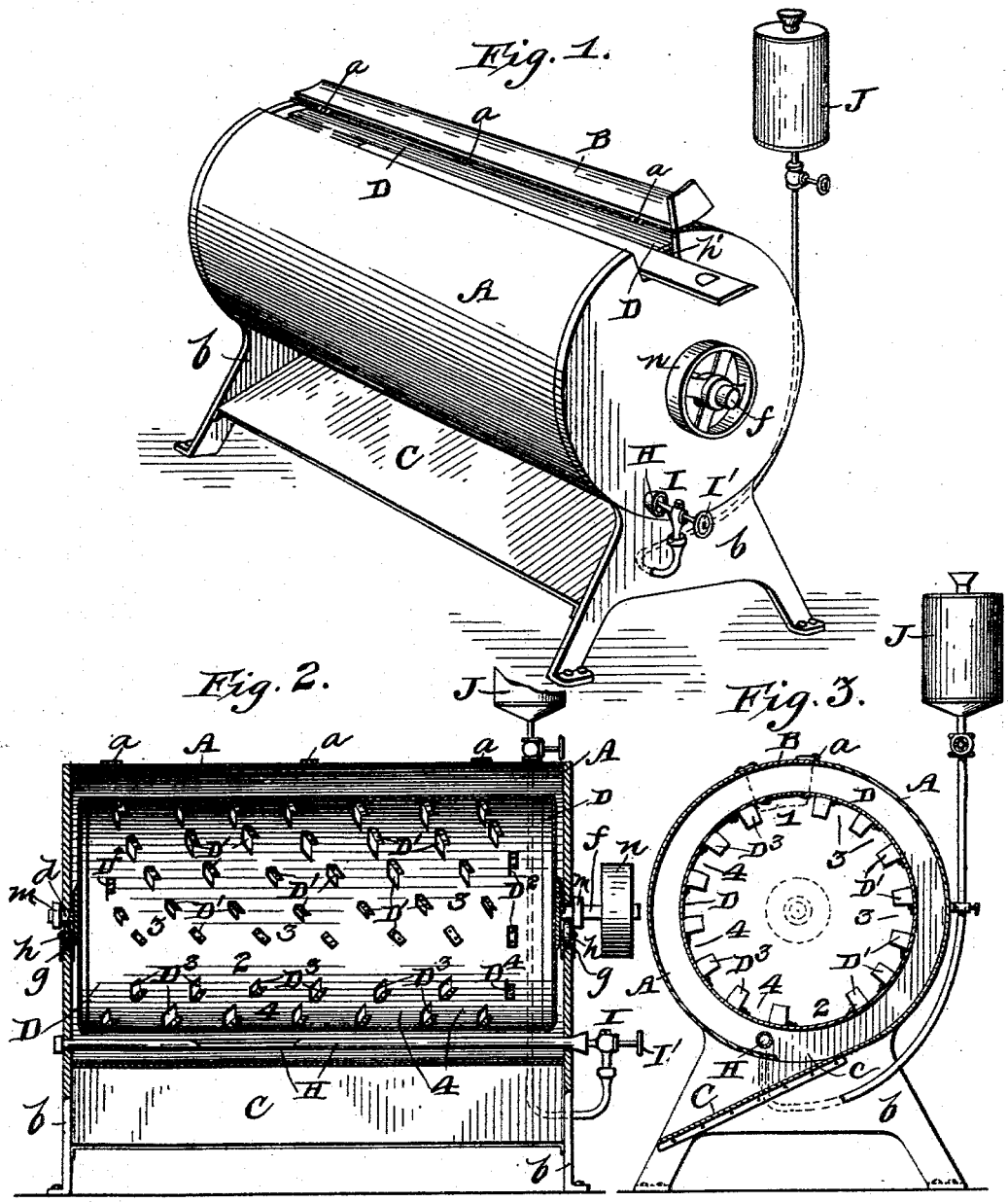

EDWIN RUTHVEN JONES AND GEORGE LITTLE, OF NORTH BLOOMFIELD, OHIO.

COFFEE-ROASTER.

SPECIFICATION forming part of Letters Patent No. 514,553, dated February 13, 1894.

Application filed March 7, 1893. Serial No. 464,995. (No model.)

*To all whom it may concern:*

Be it known that we, EDWIN RUTHVEN JONES and GEORGE LITTLE, citizens of the United States, residing at North Bloomfield, in the county of Trumbull and State of Ohio, have invented certain new and useful Improvements in Coffee-Roasters; and we do hereby declare the following to be a full, clear, and exact description of the invention, such as will enable others skilled in the art to which it appertains to make and use the same.

Our invention consists in a coffee roaster which is adapted to be heated by gasoline or other suitable means, and comprising in its construction a rotary cylinder of novel character, interiorly; the same having on its inner curved surface two or more series of reversely set and spaced metal projecting pieces which serve as lifters, back and forward conveyers, agitators, distributers and mixers; and said cylinder being arranged within a stationary case, preferably, of cylindrical form, in such manner that the gasoline burner or other heating means can be applied between the two cylinders; and said stationary cylindrical case being provided with a coffee supply opening, covered by a movable lid, preferably hinged, through which the coffee mixture or beans can be introduced to the revolving cylinder; and also with a passage through which the roasted coffee can be discharged upon a suitable conducting shelf or pan; and the revolving cylinder being provided with a long opening in its top closed by a slide or other suitable means, on opening which the coffee is allowed to enter the cylinder and by closing it is confined until roasted, and, after the coffee is roasted, by again opening it and turning the cylinder the proper distance, the roasted coffee can be discharged through the opening in the stationary cylinder, upon the shelf or pan and directed to a receiver.

The special character and utility of our improvements will be more fully understood from the following specification, claims and accompanying drawings, in which latter—

Figure 1 is a perspective view of our coffee roaster with the cover of the stationary cylinder thrown upon its hinges, and the slide of the revolving cylinder partly drawn out. Fig. 2 is a vertical longitudinal section of the coffee roaster as adapted for use, the revolving cylinder being adjusted to show the two series of conveying projections. Fig. 3 is a cross section of the roaster shown in Figs. 1 and 2.

A in the drawings represents a stationary cylinder or case; B a cover attached, preferably, by hinges $a$, and extending from end to end of the cylinder, and C is an inclined conducting plate or pan applied between the standards $b$ of the cylinder A and extended up to the discharge passage $c$ in the bottom of the cylinder, and also extending from end to end thereof.

D is a revolving cylinder of considerably less diameter than the cylinder A, and also a little shorter than the same; this cylinder is provided with a trunnion $d$ at one end, and a short pulley shaft $f$ at its other end; and it is fitted in suitable bearings $g$ in which friction rollers $h$ are applied, so that the trunnion $d$ and pulley shaft $f$, properly confined by means of collars $m$, will revolve with a minimum of friction. On the shaft $f$ a belt pulley $n$ is applied for the purpose of revolving the cylinder. The cylinder D has an opening in its top, extending from end to end, and in this opening a slide is properly fitted,—said slide passing through a passage $h'$ in one of the heads of the stationary cylinder,—and thus can be inserted or withdrawn conveniently.

On the inner surface of the cylinder D, angular metal pieces $D'$ $D^2$ $D^3$ $D^4$, which serve as lifters, conveyers, agitators, distributers and mixers, are applied, by rivets passed through the shorter branches of the pieces as shown. On nearly one half of the inner surface of the cylinder the lifters and conveyers $D'$ are arranged obliquely on spiral lines running nearly to one end of the cylinder; and at the beginning and terminus of these spiral lines of lifters and conveyers, the pieces $D^2$ are applied so as to stand parallel with the ends of the cylinder. On nearly the entire other half of the cylinder, the angular pieces $D^3$ $D^4$ are arranged, but those $D^3$ are set just the reverse of those $D'$; and those $D^4$ are set so as to stand parallel with the opposite end of the cylinder.

It will be observed from the drawings, that between the two series of projections $D'$ $D^2$ and $D^3$ $D^4$, spaces 1 and 2 of greater width than the width of the spaces 3 and 4 which are left between the spiral lines of projections of the respective series. This is important, as the coffee being roasted, whether in the form of the bean, or in a ground state and having other substances added to it, can pass into each of these spaces from one series of lifters to the other in a regular, and equably distributed condition, and the heat applied to it a uniform degree along the whole cylinder. It will also be observed that the coffee in passing from one end of the cylinder to the other, in its right and left movements, is prevented from being forced with a screw power like force against the ends of the cylinder, by means of the parallelly arranged projections, and thus the crowding of it in a mass against the heads of the cylinder cannot take place, as in constructions where all of the projections are set diagonally on the inner surface of the cylinder. By making the projections or lifters separate from one another, and properly spacing them, the coffee mixture is stirred up and mixed more thoroughly than when continuous spiral lifting projections are adopted, because the coffee mixture, or even coffee in bean form, can pass between the projections and fall upon preceding projections during its movement along the cylinder, whether it is moved to the right or left by the projections. This construction also insures the subjection of the coffee mixture or beans, in an equably distributed manner, to the heat by which it is roasted, and thus the burning or unduly scorching of it is avoided. Where the coffee mixture or coffee beans collect in thick and thin masses, or large and small quantities, as often occurs when it is conveyed only in one direction, or by continuous or unbroken lines of projections, the heat cannot act upon it equally, and while some parts will he half roasted, others will be burned or scorched.

For roasting the coffee a gasoline burner tube H with a slit in its top is passed between the cylinders, a considerable space for circulation of air and flame being provided above and below the tube. At one end of the gasoline burner-tube which is flared, a gasoline burner attachment I having a regulation cock $I'$, is applied, and this attachment is connected by a pipe with a gasoline tank J. The gasoline burner is lighted, and as fast as the vapor is burned a fresh supply is admitted through the regulation cock, which supply can be increased or diminished according to the amount of heat desired beneath the cylinder.

In operating with this roaster, the cover is thrown up, the slide opened and the coffee from a sack and other holder introduced into the cylinder; the slide and cover are then closed, the burner lighted and the cylinder revolved until the coffee is roasted.

When the roasting of the coffee mixture, or beans has been effected, the cylinder is arrested, the slide opened and the cylinder then turned far enough around to bring the opening therein in coincidence with the opening in the stationary case or cylinder, whereupon the coffee is discharged upon the inclined shelf or pan, and is directed into a receiver.

What we claim as our invention is—

1. A coffee roaster provided with a revolving roasting cylinder having different series of projections on its inner surface, one series occupying nearly one longitudinal half of the inner surface of the cylinder and running on spiral lines extending from one end to the other end of the cylinder and serving for conveying the coffee toward one end of the cylinder and depositing it at said end, and the other series occupying nearly the other half of the inner surface of the cylinder and also being on spiral lines extending from one end to the other of the cylinder and serving for returning or conveying it to the opposite end of the cylinder, substantially as described.

2. A coffee roaster provided with a revolving cylinder having lifting projections arranged in different series on its inner surface, one series occupying nearly one longitudinal half of the inner surface of the cylinder and running obliquely on spiral lines to one end of the cylinder and the other series running obliquely on spiral lines in an opposite direction toward the other end of the cylinder, said series of projections having receiving spaces between them, which are parallel to the axis of the cylinder, substantially as described.

3. A coffee roaster provided with a revolving cylinder having several series of projections on its inner surface, one series being arranged obliquely on spiral lines and serving for conveying the coffee in a right hand direction, another series being arranged obliquely on spiral lines and serving for returning or conveying the coffee in a left hand direction, and the other two series of projections arranged parallel with the ends of the cylinder, substantially as described.

4. A coffee roaster comprising a stationary cylinder having a covered opening at top, a discharge opening at bottom, a revolving cylinder having its trunnion and short shaft mounted on rollers, said cylinder being provided with an opening closed by a slide and with right and left series of projections on the inner surface between which are parallel receiving spaces, the projections of two of the series being set obliquely on spiral lines and those of the other two series parallel with the ends of the cylinder, the inclined shelf or pan, the slitted gasoline burner-tube arranged between the cylinders and a gasoline supplying, vaporizing and regulating attachment, substantially as described.

In testimony whereof we hereunto affix our signatures in presence of two witnesses.

EDWIN RUTHVEN JONES.
GEORGE LITTLE.

Witnesses:
MAME J. WINDRAM,
MARY A. SMITH.